United States Patent Office 3,284,481
Patented Nov. 8, 1966

3,284,481
α,α'-BIS(SUBSTITUTED SULFONYLTHIO)-p-TOLYL ETHERS
Joseph E. Dunbar, Midland, Mich., assignor to The Dow Chemical Company, Midland, Mich., a corporation of Delaware
No Drawing. Filed Oct. 28, 1963, Ser. No. 319,493
3 Claims. (Cl. 260—453)

The present invention is directed to α,α'-bis-(substituted sulonylthio)-p-tolyl ethers corresponding to the formula

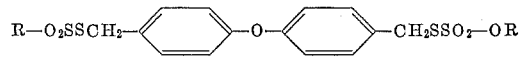

In this and succeeding formulae, R represents a member of the group consisting of lower alkyl, phenyl, lower alkyl-phenyl, halophenyl and lower alkyl-halophenyl. In the present specification and claims, the expression "lower alkyl" is employed to designate an alkyl group containing up to and including 6 carbon atoms. These compounds are crystalline solids at room temperature, somewhat soluble in many common organic solvents and of low solubility in the water. The compounds are useful as pesticides and are adapted to be employed for the control of a number of insect, fungal, bacterial, Pisces and helminth organisms such as tapeworms, roaches, fish and *Staphylococcus aureus*.

The novel α,α'-bis(substituted sulfonylthio)-p-tolyl ethers of the present invention are prepared by reacting a bis(α-halo-p-tolyl) ether corresponding to the formula:

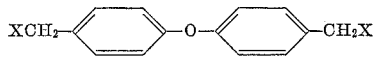

where X represents halogen, with an alkali metal salt of a thiosulfonic acid corresponding to the formula:

Alkali metal —S—SO$_2$—R

The reaction conveniently is carried out in an organic liquid as reaction medium such as dimethyl sulfoxide, dimethylformamide, dimethyl sulfone, ethanol, methanol, n-propanol, nitromethane, acetone, isopropanol, aqueous acetone, aqueous methanol and aqueous ethanol. The amounts of the reagents to be employed and reaction are not critical, some of the desired product being obtained at once when any proportion of the reactants are employed. In a preferred method of operation, good results are obtained when employing one molecular proportion of the bis(α-halo-p-tolyl) ether with about two molecular proportions of the alkali metal salt of the thiosulfonic acid, such as the sodium or potassium salt. Representative materials to be employed are the bis(α-chloro-,
α-bromo,
or α-iodo-p-tolyl) ether,
potassium 2,4,5-trimethylphenylthiosulfonate,
sodium butanethiosulfonate,
sodium 3-methyl-5-chlorobenzenethiosulfonate,
sodium 3,5-dimethyl-4-bromobenzenethiosulfonate,
potassium 4-iodobenzenethiosulfonate,
potassium propanethiosulfonate,
sodium 2,4,5-trichlorobenzenethiosulfonate,
potassium 3,4,5-tribromobenzenethiosulfonate,
sodium 2,6-dimethyl-4-chlorobenzenethiosulfonate, and
sodium 3-ethyl-5-iodobenzenethiosulfonate.

The reaction takes place at temperatures at which halide of reaction is formed, and conveniently at the temperatures between 30 and 120° C. Usually the reaction is carried out at temperatures between 55 and 100° C. The halide of reaction appears in the reaction mixture as alkali metal halide.

In carrying out the reaction, the reactants are mixed and contacted together in any convenient fashion and the resulting mixture maintained for a period of time in the reaction temperature range to insure completion of the reaction. Following the reaction, the reaction mixture is processed by conventional procedures to obtain the desired product. In one convenient procedure, the reaction mixture is filtered while warm to remove the halide of reaction. The filtrate is then cooled to room temperature bringing about the precipitation of the product as a crystalline solid. This product may be used in pesticidal compositions or further purified by conventional procedures. In another convenient procedure, the halide of reaction and product can be precipitated out of the reaction mixture. The halide of reaction is then removed from the product by washing with water. The collected product may then be further purified by such conventional procedures as decolorization with activated charcoal and recrystallization from an organic solvent.

The following examples merely illustrate the invention and are not to be construed as limiting.

*Example 1.—α,α'-Bis(methylsulfonylthio)-p-tolyl ether*

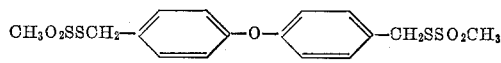

Potassium methanethiosulfonate (30.1 grams; 0.200 mole) and bis(α-chloro-p-tolyl) ether (26.7 grams; 0.100 mole) were dispersed in 300 milliliters of ethanol. The resulting mixture was heated with stirring at the boiling temperature and under reflux for two and three-quarter hours. The hot reaction mixture was then filtered to remove the potassium chloride of reaction and the filtrate was diluted with a small amount of hot ethanol to prevent the product from separating in the reaction mixture as an oil. The filtrate, thus treated, was then allowed to cool to room temperature. During the cooling period, the α,α'-bis(methylsulfonylthio)-p-tolyl ether product precipitated as colorless plates. Upon recrystallization from a benzene-cyclohexane mixture the product melted at 99.5–100.5° C. and had carbon, hydrogen, and sulfur contents of 46.00, 4.43 and 30.86 percent, respectively, as compared to the theoretical contents of 45.91, 4.33 and 30.64 percent.

*Example 2.—α,α'-Bis(4-bromophenylsulfonylthio)-p-tolyl ether*

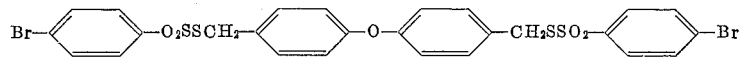

Potassium p-bromobenzenethiosulfonate (29.1 grams; 0.100 mole) and bis(α-chloro-p-tolyl) ether (13.4 grams; 0.0500 mole) were dispersed in 30 milliliters of dimethyl formamide. The resulting mixture was heated with stirring at a temperature of 95° C. for twenty minutes. The hot reaction mixture was filtered to remove the halide of reaction and the filtrate was rapidly diluted by pouring it into 400 milliliters of ice water. The organic layer which formed in the diluted mixture was separated from the aqueous layer by decantation. This organic layer was then dissolved in hot ethanol, decolorized with activated charcoal, filtered and allowed to cool to room temperature. During the cooling period, the α,α'-bis(4-bromophenylsulfonylthio)-p-tolyl ether product precipitated as a white crystalline solid. This crystalline material was collected by filtration and recrystallized from ethanol. The recrystallized product melted at 97–99° C. and had carbon, hydrogen and sulfur contents of 44.65, 3.04 and 18.42 percent, respectively, as compared to the theoretical contents of 44.58, 2.88 and 18.31 percent.

*Example 3.—α,α'-Bis(p-tolylsulfonylthio)-p-tolyl ether*

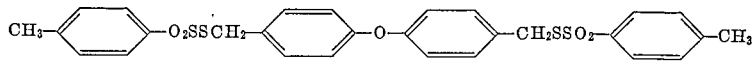

Potassium p-toluenethiosulfonate (22.6 grams: 0.100 mole) and 13.4 grams (0.0500 mole) of bis(α-chloro-p-tolyl) ether were dispersed in 30 milliliters of dimethylformamide. The resulting mixture was heated, with stirring, at a temperature of 95° C. for thirty minutes, at which time the hot reaction mixture was filtered to remove the potassium chloride of reaction. The filtrate was then diluted by pouring it into 400 milliliters of ice water whereupon an oil separated from the diluted mixture. The oil was triturated with ethanol and allowed to remain in contact with the supernatant ethanol for one day. By the end of this period, the α,α'-bis(p-tolylsulfonylthio)-p-tolyl ether product had precipitated as a white crystalline solid which was collected by filtration and recrystallized from methanol. The recrystallized product melted at 99–101° C. and had carbon, hydrogen and sulfur contents of 58.95, 4.50 and 22.70 percent, respectively, as compared to the theoretical contents of 58.92, 4.59, and 22.47 percent.

The following novel compounds of the present invention can be prepared in a similar manner.

α,α'-Bis(hexylsulfonylthio) - p - tolyl ether (molecular weight of 558) by reacting together bis(α-bromo-p-tolyl) ether and potassium hexanethiosulfonate.

α,α'-Bis(4-hexylphenylsulfonylthio)-p-tolyl ether (molecular weight of 711) by reacting together bis(α-bromo-p-tolyl) ether and sodium 4-hexylbenzenethiosulfonate.

α,α' - Bis(2,6 - dibromo - 4 - isopropylphenylsulfonylthio)-p-tolyl ether (molecular weight of 946) by reacting together bis(α-chloro-p-tolyl) ether and sodium 2,6-dibromo-4-isopropylbenzenethiosulfonate.

α,α' - Bis(3,5 - diethyl - 4 - chlorophenylsulfonylthio)-p-tolyl ether (molecular weight of 665) by reacting together bis(α-chloro-p-tolyl) ether and sodium 3,5-diethyl-4-chlorobenzenethiosulfonate.

α,α' - Bis(pentamethylphenylsulfonylthio)-p-tolyl ether (molecular weight of 683) by reacting together bis(α-bromo-p-tolyl) ether and sodium pentamethylbenzenethiosulfonate.

α,α' - Bis(ethylsulfonylthio) - p - tolyl ether (melting at 80–82° C. and having carbon, hydrogen and nitrogen contents of 48.52, 5.01 and 28.76 percent, respectively, as compared to the theoretical contents of 48.41, 4.97 and 28.71 percent) by reacting together potassium ethanethiosulfonate and bis(α-chloro-p-tolyl)ether.

The compounds of the present invention are useful as parasiticides for the control of a number of bacterial insect, helminth and fish pests. For such uses the products may be dispersed on an inert finely divided solid and employed as dusts. The compounds may also be dispersed in water with or without the aid of a surface active agent, and the resulting aqueous suspensions employed as sprays. In other procedures, the products are employed in active constituents in solvent solutions, oil-in-water or water-in-oil emulsions, or aqueous dispersions. In a representative operation α,α'-bis(methylsulfonylthio)-p-tolyl ether gave 100 percent control and kill of lake emerald shiner at concentrations of 2 parts per million by weight. In other representative operations α,α'-bis(ethylsulfonylthio)-p-tolyl ether gave excellent control and kill of *Staphylococcus aureus* when employed at concentrations of 1 percent by weight.

The thiosulfonates employed as starting materials in accordance with the teachings of the present invention can be prepared in accordance with known methods. In one method, potassium hydrosulfide (KSH) is reacted with a suitable lower alkane, benzene, halobenzene, lower alkylbenzene, or lower alkyl-halobenzene sulfonyl chloride or bromide wherein halo represents chlorine, bromine or iodine. Representative halides include, pentanesulfonyl chloride, 2,4,6-trichlorobenzenesulfonyl bromide, 3-iodo-5-ethylbenzenesulfonyl chloride, 4-butylbenzenesulfonyl chloride, 2,6-dichloro-4-methylbenzenesulfonyl chloride, propanesulfonyl chloride, 3,4,5-trimethylbenzenesulfonyl chloride, 5-iodobenzene sulfonyl chloride, and 2,5-diethylbenzenesulfonyl bromide. In a convenient procedure, the reaction is carried out by adding the sulfonyl halide to an aqueous or alcoholic solution of potassium hydroxide saturated with H₂S. Upon completion of the reaction, the desired starting materials are separated by conventional procedures.

The bis(α-halo-p-tolyl) ether compounds, wherein halo represents chlorine and bromine, employed as starting materials in the present invention are prepared by known procedures. The bis(α - chloro - p - tolyl)ether compound can be prepared by passing hydrogen chloride gas into a solution of formalin, glacial acetic acid and diphenyl ether. The product is separated and purified by conventional means. The bis(α-bromo-p-tolyl) ether starting material is prepared by reacting diphenyl oxide, paraformaldehyde, aqueous hydrobromic acid, concentrated sulfuric acid and acetic acid. The reaction mixture is heated at the boiling temperature a short period of time. The reaction mixture is then cooled and the bis(α-bromo-p-tolyl) ether product isolated from the organic layer by conventional procedures.

I claim:

1. A compound corresponding to the formula

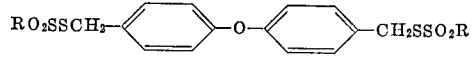

wherein R represents a member of the group consisting of lower alkyl, phenyl, lower alkylphenyl, halophenyl, and lower alkyl-halophenyl, wherein halo represents a member of the group consisting of chlorine, bromine and iodine.

2. α,α'-Bis(methylsulfonylthio)-p-tolyl ether.
3. α,α'-Bis(ethylsulfonylthio)-p-tolyl ether.

No references cited.

CHARLES B. PARKER, *Primary Examiner.*

D. R. MAHANAND, *Assistant Examiner.*